United States Patent
Cho

(10) Patent No.: US 8,682,908 B2
(45) Date of Patent: Mar. 25, 2014

(54) INFORMATION PROCESSING APPARATUS, INFORMATION PROCESSING METHOD, AND INFORMATION PROCESSING PROGRAM

(75) Inventor: Kikyo Cho, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 783 days.

(21) Appl. No.: 12/007,873

(22) Filed: Jan. 16, 2008

(65) Prior Publication Data

US 2008/0172389 A1 Jul. 17, 2008

(30) Foreign Application Priority Data

Jan. 17, 2007 (JP) ................................. 2007-008196

(51) Int. Cl.
*G06F 17/30* (2006.01)

(52) U.S. Cl.
USPC ............................ 707/752; 707/753; 715/790

(58) Field of Classification Search
USPC ................... 707/736, 748, 752, 753; 715/790
See application file for complete search history.

(56) References Cited

U.S. PATENT DOCUMENTS

| | | | |
|---|---|---|---|
| 5,339,392 A | | 8/1994 | Risberg et al. |
| 5,878,410 A | * | 3/1999 | Zbikowski et al. ................... 1/1 |
| 6,185,574 B1 | * | 2/2001 | Howard et al. ........................ 1/1 |
| 7,328,407 B2 | * | 2/2008 | MacLaurin ................... 715/744 |
| 7,620,633 B1 | * | 11/2009 | Parsons et al. ..................... 707/7 |
| 2003/0225888 A1 | * | 12/2003 | Wason .......................... 709/227 |
| 2005/0216499 A1 | * | 9/2005 | Parzygnat et al. ............. 707/102 |
| 2006/0206456 A1 | * | 9/2006 | Komamura et al. .............. 707/3 |
| 2007/0112785 A1 | * | 5/2007 | Murphy et al. ................. 707/10 |
| 2008/0091749 A1 | * | 4/2008 | Kitamaru ..................... 707/205 |

FOREIGN PATENT DOCUMENTS

| | | |
|---|---|---|
| JP | 2927548 | 5/1999 |
| JP | 2004-135323 | 4/2004 |
| JP | 2004-295671 | 10/2004 |
| JP | 2006-301923 | 11/2006 |
| WO | WO92/12488 | 7/1992 |

* cited by examiner

*Primary Examiner* — Vincent F Boccio

(74) *Attorney, Agent, or Firm* — Harness, Dickey & Pierce, P.L.C.

(57) ABSTRACT

An information processing apparatus is disclosed that includes a processor, a storage device, a display device that displays a list of files accessible by the processor which list is sorted using an item of attribute information of the files as a sort key, a storing unit that stores information pertaining to display positions of the files within the list and information pertaining to the sort key used to sort the list in the storage device, a selecting unit that selects another item of attribute information of the files as a selected sort key, a sorting unit that executes re-sorting operations on the list using the selected sort key and generates a re-sorted list to be displayed by the display device, and a restoring unit that uses the information stored in the storage device to restore the re-sorted list back to the list displayed prior to execution of the re-sorting operations.

10 Claims, 12 Drawing Sheets

FIG.2

| FILE(F) | EDIT(E) | | | |
|---|---|---|---|---|
| ADDRESS (D) | FOLDER 1 | ⌄ | → MOVE | LINK » |
| FOLDER | NAME △ | SIZE | TYPE | UPDATE DATE/TIME |
| STORAGE DEVICE 130 | a.JPG | 20 KB | ACDSee 7.0 JPEG Image | 2006/06/21 13:02 |
| ⊞ FOLDER 1 | b.xls | 33 KB | Microsoft Excel Worksheet | 2006/06/23 22:36 |
| | c.html | 6 KB | HTML Document | 2006/04/28 17:15 |
| | d.doc | 1,451 KB | Microsoft Word Document | 2006/04/28 17:47 |
| | e.pdf | 121 KB | Adobe Acrobat 7.0 docum... | 2006/06/13 19:37 |
| | f.doc | 87 KB | Microsoft Word Document | 2006/06/23 16:19 |

| FILE(F) | EDIT(E) | | | |
|---|---|---|---|---|
| ADDRESS(D) | FOLDER 1 | | ∨ | → MOVE LINK » |

| FOLDER | | NAME △ | SIZE | TYPE | UPDATE DATE/TIME |
|---|---|---|---|---|---|
| STORAGE DEVICE 130 | | a.JPG | 20 KB | ACDSee 7.0 JPEG Image | 2006/06/21 13:02 |
| └ FOLDER 1 | | b.xls | 33 KB | Microsoft Excel Worksheet | 2006/06/23 22:36 |
| | | c.html | 6 KB | HTML Document | 2006/04/28 17:15 |
| | | d.doc | 1,451 KB | Microsoft Word Document | 2006/04/28 17:47 |
| | | e.pdf | 121 KB | Adobe Acrobat 7.0 docum... | 2006/06/13 19:37 |
| | | f.doc | 87 KB | Microsoft Word Document | 2006/06/23 16:19 |

| FILE(F) | EDIT(E) | | | |
|---|---|---|---|---|
| ADDRESS(D) | FOLDER 1 | | ∨ | → MOVE LINK ≫ |

| FOLDER | × | NAME △ | SIZE | TYPE |
|---|---|---|---|---|
| 📁 STORAGE DEVICE 130 | | 🖼 a.JPG | 20 KB | ACDSee 7.0 JPEG Image |
| └─⊞ 📁 FOLDER 1 | | 📊 b.xls | 33 KB | Microsoft Excel Workshee |
| | | 🌐 c.html | 6 KB | HTML Document |
| | | 📄 d.doc | 1,451 KB | Microsoft Word Document |
| | | 📕 e.pdf | 121 KB | Adobe Acrobat 7.0 docum |
| | | 📄 f.doc | 87 KB | Microsoft Word Document |

Popup menu:
- ✓ NAME
- ✓ SIZE
- ✓ TYPE
- ✓ UPDATE DATE/TIME
- CREATION DATE/TIME
- ATTRIBUTE
- OWNER
- ✗ CREATOR
- TITLE
- COMMENT
- ARTIST
- ALBUM TITLE
- YEAR
- TRACK NUMBER
- GENRE
- LENGTH

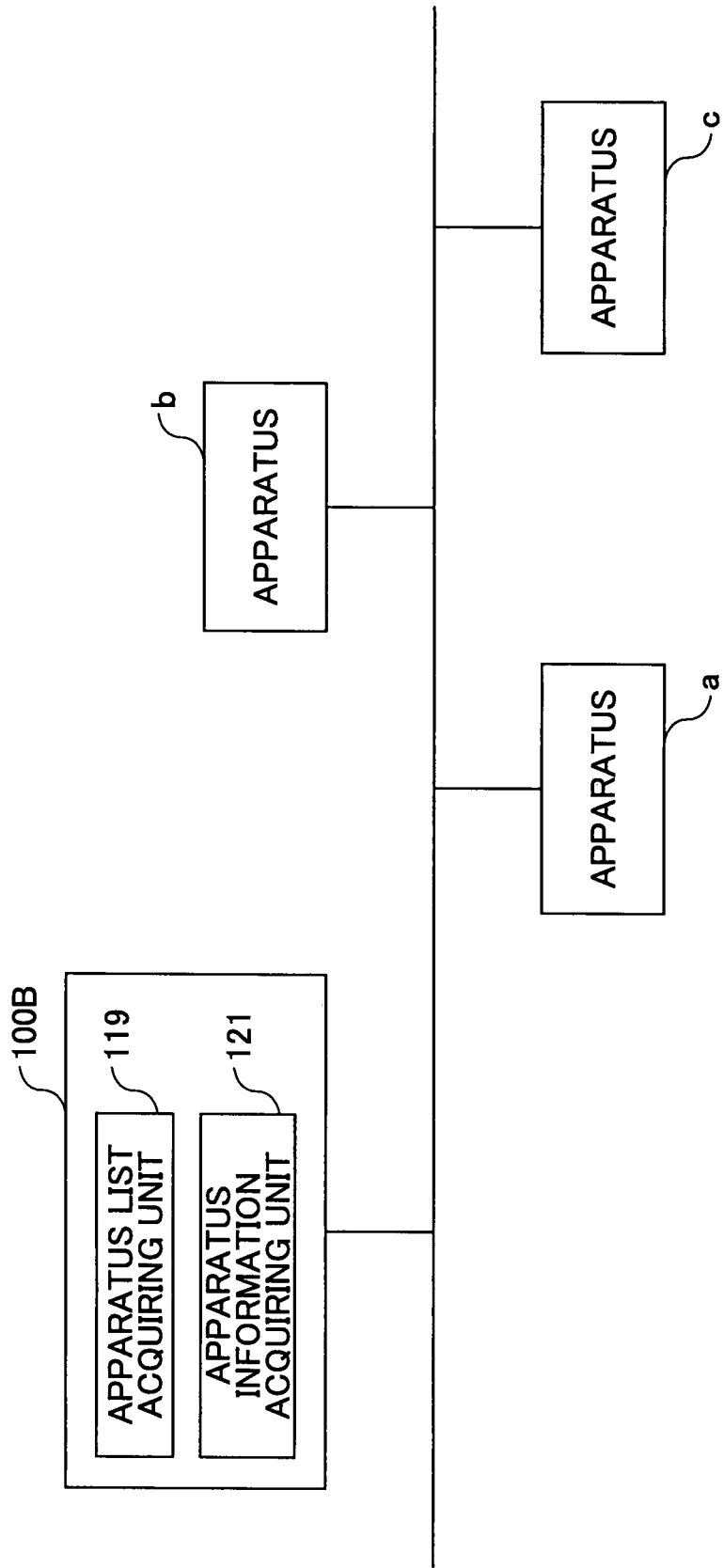

FIG.10

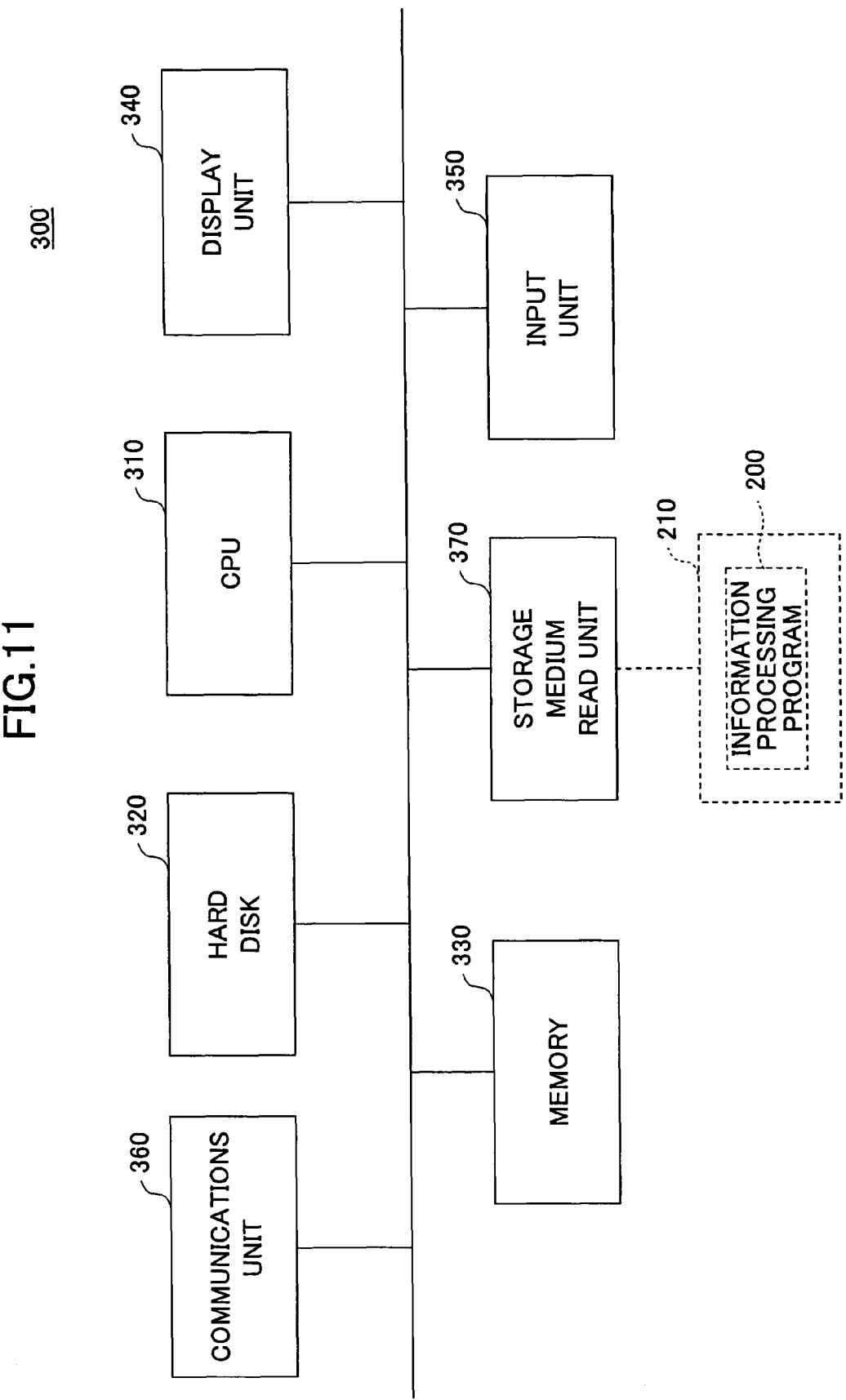

INFORMATION PROCESSING APPARATUS, INFORMATION PROCESSING METHOD, AND INFORMATION PROCESSING PROGRAM

BACKGROUND OF THE INVENTION

1. Field of the Invention

The present invention relates to an information processing apparatus, an information processing method, and an information processing program for sorting a list displayed on a display apparatus.

2. Description of the Related Art

An information processing apparatus may be configured to enable manipulation of a list displayed thereon that lists files that may be accessed from this information processing apparatus. Files that may be accessed by the information processing apparatus may be documents files stored in a storage device of the information processing apparatus and/or document files stored in a storage device of an apparatus connected to the information processing apparatus, for example.

Such files may contain plural items of attribute information including information on the file creator and the date/time of file creation, for example. The list displayed on the information processing apparatus has files sorted using one of the items of attribute information as a sort key. The information processing apparatus as is described above that displays the list of files sorted using a sort key may be configured to enable change of the attribute information being used as the sort key to a different item of attribute information and display a list that has files sorted using the different attribute information as the sort key.

In the following, an example is described in which an information processing apparatus is configured to display a list of document files using Explorer (registered trademark) installed in Windows (registered trademark). The Explorer (registered trademark) is a tool for managing files and folders. In the present example, it is assumed that a list of files sorted using the document file name as a sort key is displayed at the information processing apparatus. In the display screen showing such a list of files, certain items of document file attribute information and its corresponding item name are displayed together with the list of files. For example, the document file creation date/time and/or data size may be indicated as the attribute information displayed with the list of files.

In the information processing apparatus as is described above, when the item name of the attribute information displayed together with the list is clicked by a pointing device, for example, the sort key used for sorting the list may be changed to the attribute information item corresponding to the clicked item name. For example, in the case of changing the sort key used for sorting the list from the document file name to the document file creation date/time, the item name "document file creation date/time" displayed on the display screen may be clicked. When the sort key is selected in the above-described manner, the information processing apparatus changes the sort key used for sorting the list to the selected sort key and performs operations of re-sorting the list using the changed sort key.

Also, in the case of changing the sort key to an attribute information item that is not displayed with the list of files, editing process operations may be performed to additionally display the item name of such an attribute information item together with the list. After such editing process operations are performed, the additionally displayed attribute information item name may be selected so that the list may be re-sorted using the attribute information item corresponding to the selected item name as the sort key.

It is noted that disclosures related to a technique for displaying a list of files subject to accessing may be found in Japanese Patent Laid-Open Publication No. 2006-301923, for example, which describes a file information list display apparatus that is capable of conserving memory resources by controlling a delay in display speed upon displaying a list of file information on a display screen.

However, in the above-described information processing apparatus, once a sort key is changed and the list is re-sorted using the changed sort key, the display of the re-sorted list may not be easily switched back to the list displayed before the list is re-sorted since the list displayed before changing the sort key is not stored. Also, in the case of changing the sort key to an attribute information item that is not displayed with the list, editing process operations for displaying the attribute information item with the list may have to be performed beforehand so that operations may be complicated.

SUMMARY OF THE INVENTION

Aspects of the present invention are directed to providing an information processing apparatus, an information processing method, and an information processing program that are adapted to improve operationality without degrading list management functions.

According to one embodiment of the present invention, an information processing apparatus is provided that includes:

a processor;

a storage device;

a display device that displays a list of files accessible by the processor which list is sorted using an item of attribute information of the files as a sort key;

a storing unit that stores information pertaining to display positions of the files within the list and information pertaining to the sort key used to sort the list in the storage device;

a selecting unit that selects another item of attribute information of the files as a selected sort key;

a sorting unit that performs re-sorting operations on the list using the selected sort key and generates a re-sorted list to be displayed by the display device; and a restoring unit that uses the information stored in the storage device to restore the re-sorted list back to the list displayed prior to the execution of the re-sorting operations by the sorting unit.

According to another embodiment of the present invention, an information processing method is provided that is performed by an information processing apparatus including a processor, a storage device, and a display device that displays a list of files accessible by the processor which list is sorted using an item of attribute information of the files as a sort key, the method including the steps of:

storing information pertaining to display positions of the files within the list and information pertaining to the sort key used to sort the list in the storage device;

selecting another item of attribute information of the files as a selected sort key;

executing re-sorting operations on the list using the selected sort key and generating a re-sorted list to be displayed by the display device; and restoring the re-sorted list back to the list displayed prior to the execution of the re-sorting operations using the information stored in the storage device.

According to another embodiment of the present invention, a computer-readable medium storing a computer readable program is provided for processing information in an information processing apparatus including a processor, a storage device, and a display device that displays a list of files accessible by the processor which list is sorted using an item of attribute information of the files as a sort key, the program being executed by a computer to perform the steps of:

storing information pertaining to display positions of the files within the list and information pertaining to the sort key used to sort the list in the storage device;

selecting another item of attribute information of the files as a selected sort key;

executing re-sorting operations on the list using the selected sort key and generating a re-sorted list to be displayed by the display device; and restoring the re-sorted list back to the list displayed prior to the execution of the re-sorting operations using the information stored in the storage device.

BRIEF DESCRIPTION OF THE DRAWINGS

FIG. 2 is a diagram showing an exemplary list of files displayed on a display device of the information processing apparatus according to the first embodiment;

FIG. 8 is a diagram showing an exemplary list of sort keys displayed on a display device of the information processing apparatus according to the second embodiment;

FIG. 9 is a diagram showing a functional configuration of an information processing apparatus according to a third embodiment of the present invention;

FIG. 10 is a diagram showing an exemplary list of apparatuses displayed on a display device of the information processing apparatus according to the third embodiment; and FIG. 11 is a block diagram showing a configuration of a computer that executes an information processing program stored in a computer-readable medium according to an embodiment of the present invention.

DESCRIPTION OF THE PREFERRED EMBODIMENTS

In the following, preferred embodiments of the present invention are described with reference to the accompanying drawings.

An information processing apparatus according to an embodiment of the present invention is configured to store information pertaining to display positions of files included in an original list and information pertaining to a sort key used to sort the original list in a storage device in response to receiving a sort key change command signal. Further, the information processing apparatus according to the present embodiment is configured to restore a re-sorted list sorted using the changed sort key back to the original list using the information stored in the storage device.

First Embodiment

Figure 1:
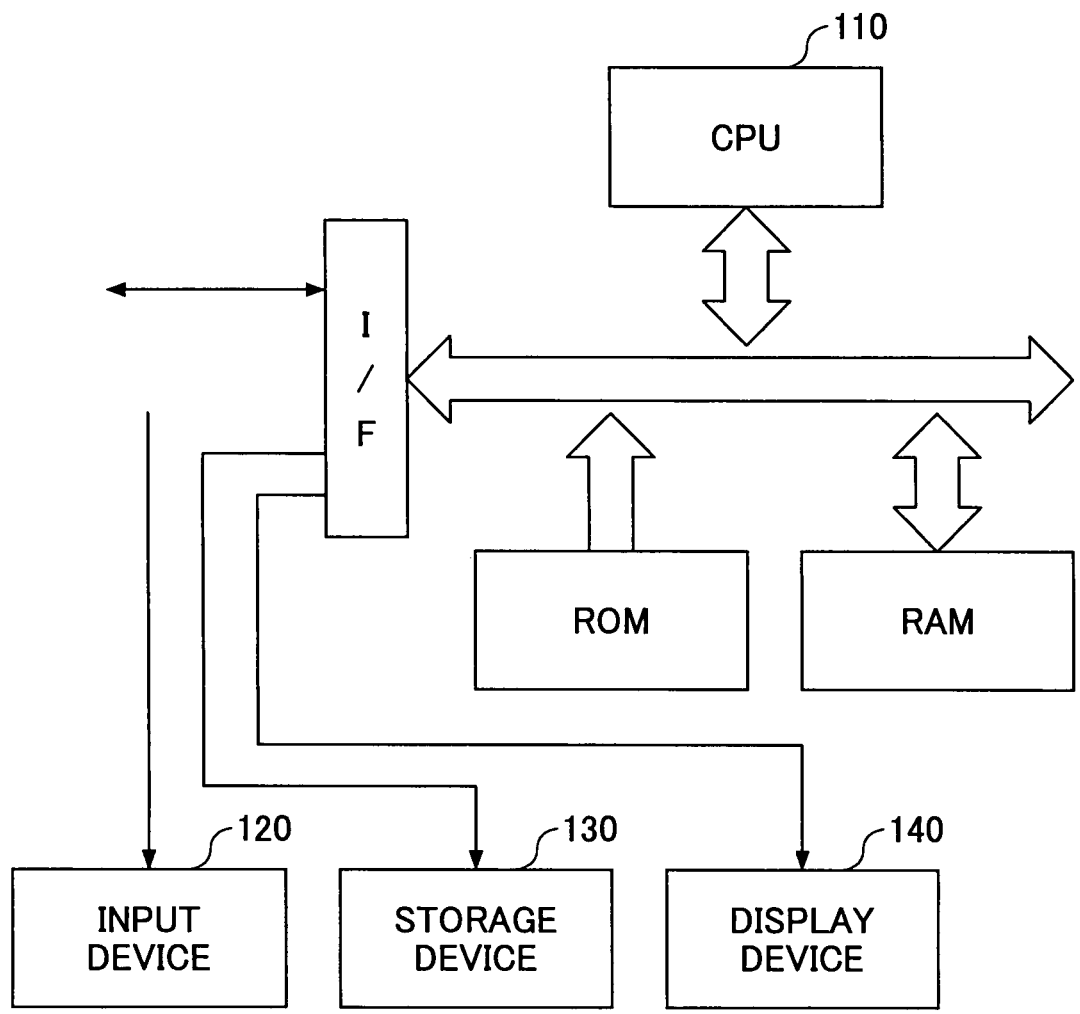
FIG. 1 is a block diagram showing a hardware configuration of an information processing apparatus according to a first embodiment of the present invention.

FIG. 1 is a block diagram showing a hardware configuration of an information processing apparatus 100 according to a first embodiment of the present invention.

The illustrated information processing apparatus 100 according to the present embodiment is a computer including a processor such as a CPU (central processing unit) 110, an input device 120, a storage device 130, and a display device 140, for example. The input device 120 may be a pointing device such as a mouse or a keyboard that includes a selecting unit for selecting a sort key, for example. The storage device 130 may be a memory or a hard disk, for example. The display device 140 may be a display unit including a display screen, for example.

The information processing apparatus 100 according to the present embodiment is configured to display a list of files that may be accessed by the processor (CPU) 110 on the display device 140. As is described in detail below, the list is arranged to be displayed in a predetermined format in which files of the list are sorted using a predetermined attribute information item as the sort key out of plural attribute information items of the files.

It is noted that files that may be accessed by the processor 110 may be various types of files including document files and image files that are created at the information processing apparatus 100 and stored in the storage device 130, for example. Such file may also include various types of files stored in a storage device of an external apparatus that is connected to the information processing apparatus 100. Also, it is noted that attribute information of a file may include information items such as file update date/time, file creator name, file data size, and file type, for example.

FIG. 2 is a diagram showing an exemplary list of files displayed on the display device 140.

In the illustrated example of FIG. 2, a list of files stored in a folder 1 created within the storage device 130 is displayed. It is noted that in displaying a list of files, the information processing apparatus 100 of the present embodiment is configured to display attribute information including the file name of the files as well as a number of other attribute information items assigned to each of the files. Specifically, in the example of FIG. 2, the file data size, the file type, and the file update date/time are displayed in association with the file name assigned to the files.

Also, it is noted that when a particular sort key is not designated at the time of displaying the list of files, the information processing apparatus 100 of the present embodiment is configured to sort the list using the file name as the sort key and display the resulting sorted list on the display device 140. The list shown in FIG. 2 is an example of such a list that is sorted using the file name as the sort key.

In the following descriptions, sorting refers to a process of rearranging a list being displayed in ascending order based on a sort key. A sort key refers to an item of information that is used as a reference for rearranging a list, and in the present embodiment, a certain attribute information item assigned to each file is used as the sort key.

The information processing apparatus 100 of the present embodiment is configured to perform operations for changing the sort key used for sorting the displayed list of files, the details of which are described below.

Upon performing operations for changing the sort key and re-sorting the list being displayed, the information processing apparatus 100 of the present embodiment is configured to store information pertaining to the display position of each file within the original list displayed before the sort key is changed and the sort key used in the original list in the storage device 130. Thus, after re-sorting the list using the changed sort key, the information processing apparatus 100 may be able to restore the re-sorted list back to the original list based on the information stored in the storage device 130.

Figure 3:
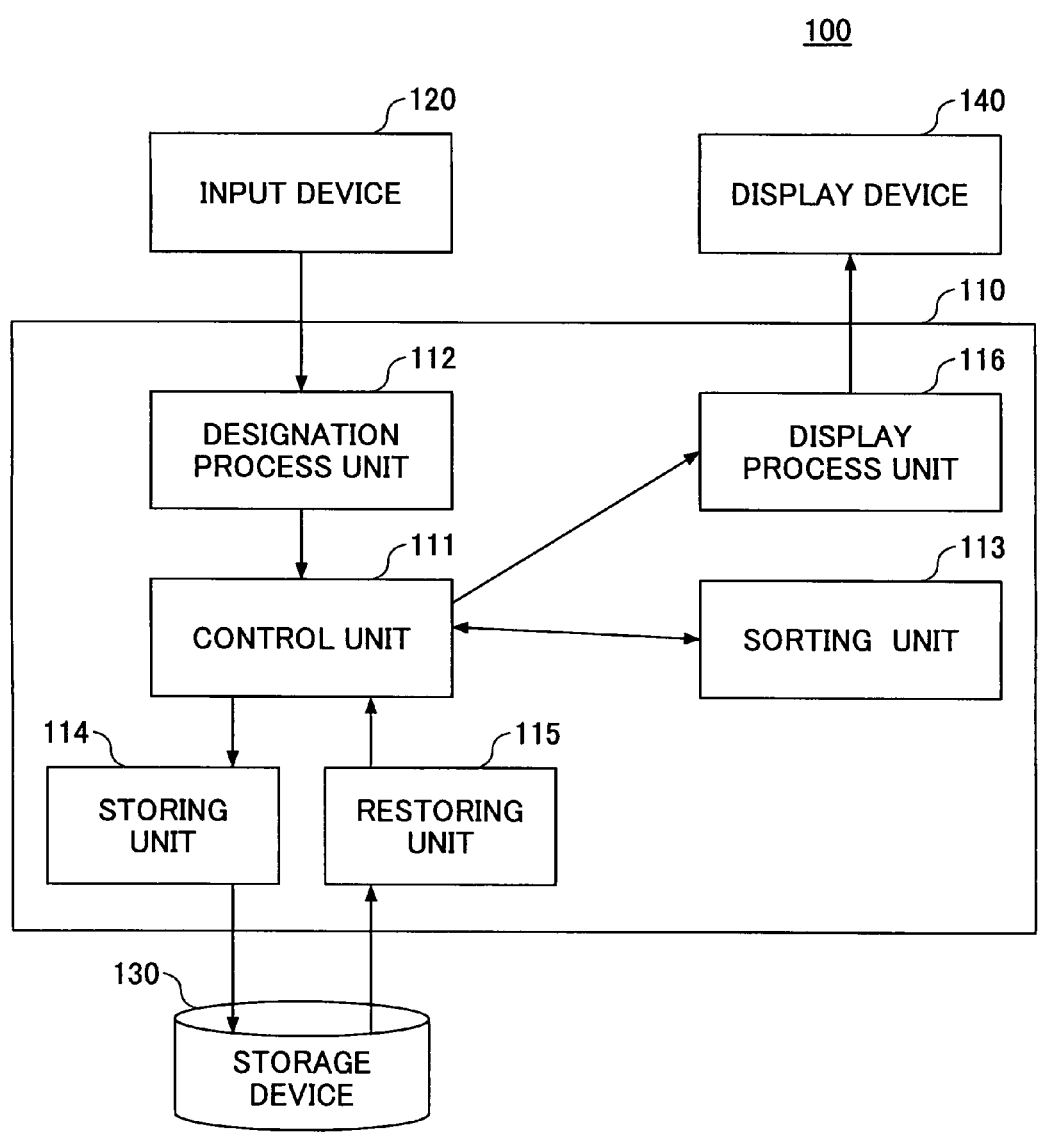
FIG. 3 is a block diagram showing a functional configuration of the information processing apparatus according to the first embodiment.

FIG. 3 is a block diagram showing a functional configuration of the information processing apparatus 100 according to the present embodiment. It is noted that the functional elements shown in FIG. 3 may be realized by having the hardware components shown in FIG. 1 co-operate with software installed in the information processing apparatus 100. In the following, functions of the information processing apparatus 100 according to the first embodiment of the present invention are described with reference to FIG. 3.

The information processing apparatus 100 includes a control unit 111, a designation process unit 112, a sorting unit 113, a storing unit 114, a restoring unit 115, and a display process unit 116 as functional units realized by the processor 110 operating in conjunction with software.

The control unit 111 is configured to control various process operations executed within the information processing apparatus 100. The designation process unit 112 is configured to acquire a designation input by a user using the input device 120 and convey the acquired designation input to the control unit 111. The sorting unit 113 is configured to sort a list of files to be displayed by the display apparatus 140.

The storing unit 114 is configured to store information on the sort key used prior to changing the same and information on display positions of files contained in the list upon performing operations for changing the sort key. The restoring unit 115 is configured to read information stored in the storage device 130 by the storing unit 114, and restore a list that is re-sorted using the changed sort key back to its original state before being re-sorted. The display process unit 116 is configured to control display operations for displaying a list on the display device 140.

Figure 4:
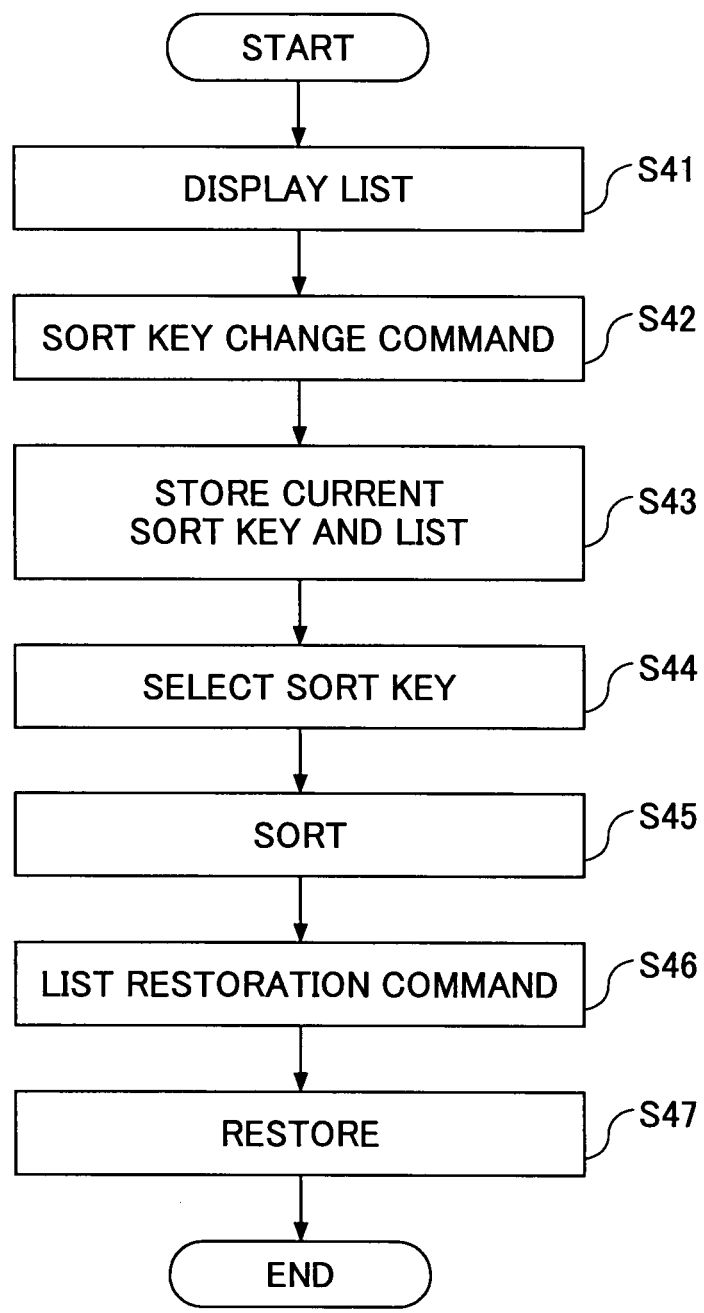
FIG. 4 is a flowchart illustrating operations of the information processing apparatus according to the first embodiment.

FIG. 4 is a flowchart illustrating operations of the information processing apparatus 100 according to the first embodiment of the present invention.

A list of files such as the list of files stored in folder 1 shown in FIG. 2 may be displayed by the display apparatus 140 of the information processing apparatus 100 (S41). When a sort key change command signal is input to the information processing apparatus 100 by a user (S42), the information processing apparatus 100 starts sort key change process operations.

In the following, the sort key change command signal used in the information processing apparatus 100 according to the present embodiment is described. The sort key change command signal may be input to the information processing apparatus 100 by a pointing device corresponding to the input device 120, for example. In the present example, it is assumed that a mouse is used as the pointing device, and when a cursor is pointed to a given position on the list being displayed by the display apparatus 140 and the click button of the mouse is pressed for at least a predetermined time period, the information processing apparatus 100 may recognize such operations as a sort key change command signal input.

Figure 5A:
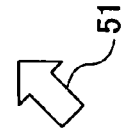
FIGS. 5A and 5B are diagrams illustrating a process of changing a sort key at the information processing apparatus according to the first embodiment.

When a sort key change command signal is input, the designation process unit 112 of the information processing apparatus 100 conveys the input sort key change command signal to the control unit 111. In one embodiment, the control unit 111 may control the display process unit 116 to display the row showing the attribute information item corresponding to the current sort key in color as is shown in FIG. 5A so that the current sort key may be easily recognized. It is noted that the click button of the mouse may be continually pressed during the above-described process step, for example.

Upon receiving the sort key change command signal from the designation process unit 112, the control unit 111 controls the storing unit 114 to store information pertaining to the display position of each file contained in the currently displayed list and the current sort key in the storage device 130 (S43). For example, the storing unit 114 may associate a number representing the display order of each file contained in the list with a corresponding file name and store the file name and number representing the display order of each file in the storage device 130 as the display position information of each file. In another example, the storing unit 114 may stored the currently displayed list itself in the storage unit 130.

Then, the control unit 111 controls the display process unit 116 to change the display of the cursor to a different shape from a normal shape. In the present example, the cursor being displayed in the different shape indicates that the sort key may be changed.

In the following, the operations for changing the display shape of the cursor are described with reference to FIGS. 5A and 5B. In FIG. 5A, a cursor 51 having a shape of an arrow corresponding to a normal shape of the cursor is displayed. When the information processing apparatus 100 receives a sort key change command signal, the display process unit 116 may be controlled to change the display of the cursor to a cursor 52 having a tear drop shape as is shown in FIG. 5B.

Figure 5B:

By changing the display shape of the cursor in the above-described manner, it may be recognized that the sort key may be changed at the information processing apparatus 100 when the cursor 52 as is shown in FIG. 5B is displayed. It is noted that the click button of the mouse may continue to be pressed during the above-described process step, for example.

When the cursor 52 is displayed indicating that the sort key may be changed in the information processing apparatus 100, the mouse may be operated by the user to select a sort key into which the current sort key is to be changed (S44). In the following, the operations for selecting the sort key are described.

In the information processing apparatus 100 according to the present embodiment, the names of items of attribute information assigned to each file are displayed along with the list of files on the display device 140. By pointing the cursor 52 to a display position of an attribution information item name being displayed with the list of files and pressing the click button of the mouse for a predetermined time period, the corresponding attribute information item to which the cursor 52 is pointed may be selected as the sort key in the information processing apparatus 100.

For example, in the illustrated example of FIGS. 5A and 5B, "file name", "size", "type", and "update date/time" are displayed as the item names of attribute information items displayed with the list of files. In FIG. 5B, the cursor 52 is pointed to the item name "size"; that is, the attribute information item describing the "size" of each file is selected as the sort key. In one preferred embodiment, the information processing apparatus 100 may be configured to display the row of attribute information item being selected as the sort key in color. In this way, a sort key may be easily selected/changed using a mouse at the information processing apparatus 100 according to the present embodiment.

When a sort key is selected in step S44, the sorting unit 113 re-sorts the list using the selected sort key (S45). Then, the list re-sorted by the sorting unit 113 is displayed by the display process unit 116. For example, the list shown in FIG. 5B may be obtained by re-sorting the list shown in FIG. 5A using the file size as the selected sort key. It is noted that the click button of the mouse may continue to be pressed during the above-described process step, for example.

After the list is re-sorted using the selected sort key, the control unit 111 may receive a restoration command signal directing the re-sorted list to be restored back to its original state (S46). In such a case, the control unit 111 controls the restoring unit 115 to restore the re-sorted list back to its original state (S47). In the following, list restoration command operations and restoration process operations of the information processing apparatus 100 according to the first embodiment are described.

In the information processing apparatus 100 according to the present embodiment, when the click button of the mouse that is continually pressed during the above-described process steps S42-S45 is released (i.e., when the click button of the mouse ceases to be pressed), the designation process unit 112 recognizes such operating status change as a list restoration command signal input and conveys this command signal to the control unit 111. In turn, the control unit 111 conveys the restoration command signal received from the designation process unit 112 to the restoring unit 115.

The restoring unit 115 reads the information on the display position of each file and the sort key used in the original list stored in the storage device 130 by the storing unit 114 in step S43, and uses the read information to restore the re-sorted list back to its original state (i.e., original list).

For example, when a number indicating the display order of each file and its corresponding file name is stored in the storage device 130 as information on the display position of each file, the restoring unit 115 may restore the re-sorted list back to its original state by reorganizing the files in proper order based on the stored number and file name. In another example, when the original list itself that is sorted using the sort key set prior to the sort key selection/change operations is stored in the storage device 130 as information on the display position of each file, the restoring unit 115 may read the stored original list and display the same on the display device 140. Also, in one embodiment, the restoring unit 115 may be configured to read the sort key set prior to the sort key selection/change operations (i.e., sort key used to sort the original list) from the storage device 130 and prompt the display process unit 116 to display the row of attribute information items identified by the item name corresponding to the read sort key in color, for example.

By performing such restoration process operations in the information processing apparatus 100 according to the present embodiment, for example, the list shown in FIG. 5B that is sorted using the selected sort key may be accurately restored back to the list shown in FIG. 5A corresponding to the original list displayed before the above-described change/selection operations.

As can be appreciated from the above descriptions, the information processing apparatus 100 according to the present embodiment is configured to store information pertaining to an original list that is displayed before sort key change/selection operations are performed so that even when a sort key is temporarily changed and the displayed list is changed as a result, the stored information pertaining to the original list may be read to accurately restore the displayed list to its original state.

Also, the information processing apparatus 100 according to the present embodiment is configured to change the sort key to a selected sort key when the click button of a mouse is pressed by a user for at least a predetermined time period and re-sort the displayed list using the selected sort key. Further, the information processing apparatus 100 according to the present embodiment is configured to restore the displayed list back to its original state prior (i.e., the original list displayed prior to the sort key change/selection operations) when the user stops pressing the click button of the mouse.

In this way, a re-sorted list resulting from changing the sort key to a selected sort key may be easily referenced, and the list displayed after the sort key change operations may be promptly restored back to the original list that is displayed before the sort key change operations at the information processing apparatus 100 according to the present embodiment.

It is noted that in the above-described embodiment of the present invention, a pointing device (mouse) is used as the input device 120. However, other embodiments are possible in which a keyboard is used as the input device 120 to perform processes similar to the above-described processes, for example.

In this case, the designation process unit 112 may be configured to determine when a predetermined key of the keyboard is pressed for at least a predetermined time period, accept such an operating status as a sort key change command signal input, and convey the sort key change command signal to the control unit 111. Further, the designation process unit 112 may be configured to determine when the predetermined key is released (i.e., ceases to be pressed), accept such operating status as a list restoration command signal, and convey the list restoration command signal to the control unit 111.

As can be appreciated from the above descriptions, the information processing apparatus 100 according to the present embodiment may realize improved operationality without degrading list management functions upon performing operations using a list of files.

Second Embodiment

In the following, a second embodiment of the present invention is described with reference to FIGS. 6-8. The second embodiment of the present invention differs from the first embodiment in that a list of items that may be used as the sort key is displayed on the display device in the process of selecting a sort key. It is noted that elements and features of the present embodiment that are substantially identical to those of the first embodiment are given the same reference numerals and their descriptions may be omitted or simplified.

Figure 6:
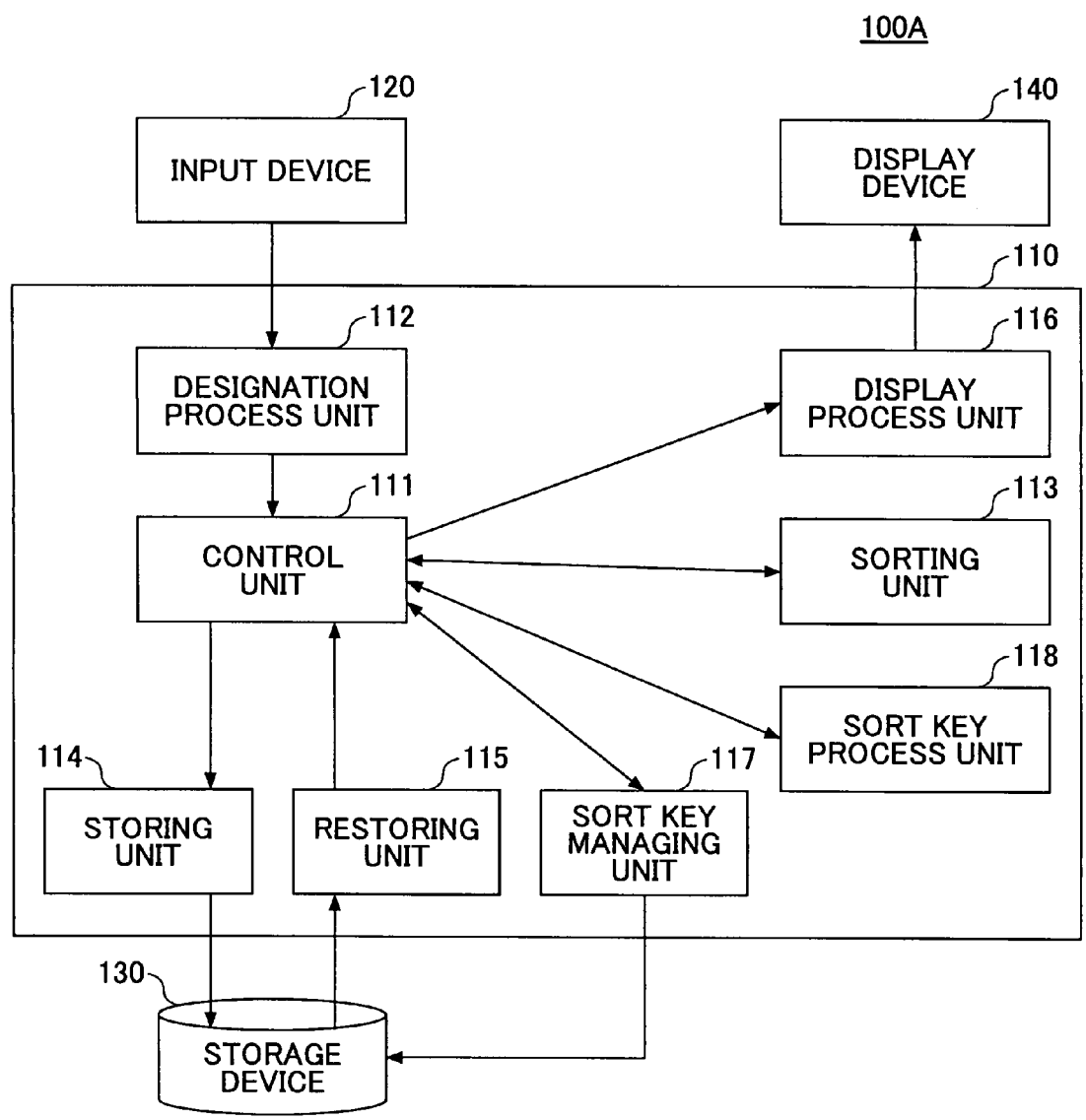
FIG. 6 is a block diagram showing a functional configuration of an information processing apparatus according to a second embodiment of the present invention.

FIG. 6 is a block diagram showing a functional configuration of an information processing apparatus 100A according to the second embodiment of the present invention.

The illustrated information processing apparatus 100A includes a sort key managing unit 117 and a sort key process unit 118 in addition to the functional units of the information processing apparatus 100 according to the first embodiment.

The sort key managing unit 117 is configured to manage a list of sort keys, the details of which are described below. In the present embodiment, various file attribute information items stored in the storage device 130 may be used as the sort key for sorting the list being displayed. Accordingly, the information processing apparatus 100A is configured to acquire the item names of the file attribute information items stored in the storage device 130 and store a list of the acquired item names in the storage device 130. The sort key managing unit 117 is configured to manage the item names of the file attribute information items stored in the storage device 130 as a list of sort keys.

The sort key process unit 118 is configured to perform process operations for displaying the list of sort keys stored in the storage device 130.

The information processing apparatus 100A according to the present embodiment is configured to display a list of item names of attribute information items that may be used as the sort key as a list of sort keys in the process of selecting a sort key. In this way, attribute information items that are not displayed with the list of files may be easily selected as the sort key.

Figure 7:
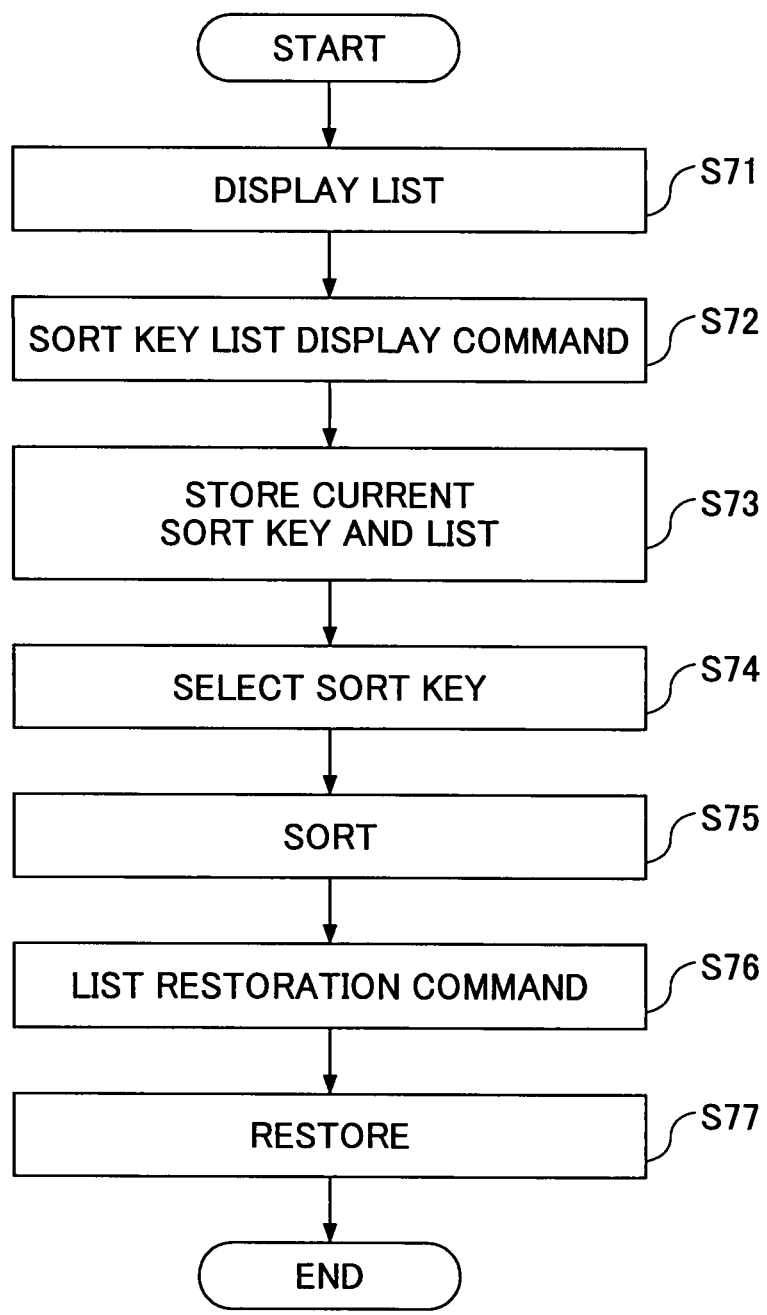
FIG. 7 is a flowchart illustrating operations of the information processing apparatus according to the second embodiment.

FIG. 7 is a flowchart illustrating operations of the information processing apparatus 100A according to the second embodiment.

According to FIG. 7, when operations of the information processing apparatus 100A are started, a list of files such as the list of files stored in folder 1 as is shown in FIG. 2 may be displayed on the display device 140 (S71). When a sort key list display command signal is issued by a user (S72), the information processing apparatus 100A starts display process operations for displaying the list of sort keys.

In the following, the operations for directing the information processing apparatus 100A to display the list of sort keys are described in detail. According to one preferred embodiment, a pointing device used as the input device 120 may include a display command unit for directing the information processing apparatus 100A to display the list of sort keys by issuing a sort key list display command signal, for example. In the following descriptions, it is assumed that the pointing device corresponds to a mouse, and when a cursor is pointed to a given position on the list being displayed by the display device 140 and the click button of the mouse is pressed for at least a predetermined time period, the designation process unit 112 of the information processing apparatus 100A is configured to recognize and accept such operating status as a sort key list display command signal input.

In the information processing apparatus 100A according to the present embodiment, upon accepting the sort key list display command signal, the designation process unit 112 conveys this command signal to the control unit 111. Upon receiving this sort key list display command signal, the control unit 111 controls the sort key managing unit 117 to read the list of sort keys from the storage device 130. Then, the control unit 111 hands over the read list of sort keys to the sort key process unit 118.

The sort key process unit 118 performs processes on the list of sort keys from the control unit 111 so that the list may be displayed on the display device 140 in a predetermined layout. Then, the sort key process unit 118 conveys the processed list of sort keys to the control unit 111. In turn, the control unit 111 controls the display process unit 116 to display the processed list of sort keys on the display device 140 (S72).

FIG. 8 is a diagram showing an example in which a list of sort keys is displayed on the display device 140. In the present embodiment, the sort key may be selected/changed at the information processing apparatus 100A when the list of sort keys is displayed on the display device 140 as in the example of FIG. 8. When the list of sort keys is displayed so that selection of a sort key is enabled at the information processing apparatus 100A, operations for storing the current sort key and information on the currently displayed list (original list) are performed (S73). It is noted that detailed descriptions of the process step S73 are omitted since this step is substantially identical to the above-described process step S43 of FIG. 4 of the first embodiment.

When the list of sort keys is displayed so that selection of a sort key is enabled at the information processing apparatus 100A, a sort key may be selected from the displayed list of sort keys (S74). In the following, operations for selecting a sort key at the information processing apparatus 100A are described in detail.

In the information processing apparatus 100A according to the present embodiment, a list of file attribute information item names as a list of sort keys is displayed on the display device 140 in addition to the file attribute information item names that are displayed together with the list of files. In one embodiment, the list of sort keys may be displayed in the form of a separate window as is shown in FIG. 8. When a cursor is pointed to one of the item names listed in the list of sort keys being displayed, the information processing apparatus 100A may determine that the item name to which the cursor is pointed is selected as the sort key.

For example, in FIG. 8, the cursor is pointed to the display position of the item name "creator" in the list of sort keys. That is, the "creator" is selected as the sort key in the example of FIG. 8. As can be appreciated from the above descriptions, in the present embodiment, a mouse may be used to easily display the list of sort keys and select a sort key from the displayed list. Also, when a list restoration command signal is issued in step S76, the operations of displaying the list of sort keys may be terminated by the display process unit 116.

It is noted that operations performed in process steps S75 through S77 of FIG. 7 are substantially identical to those performed in process steps S45 through S47 of FIG. 4 other than the above-described process of terminating the sort key list display operations so that descriptions thereof are omitted.

As can be appreciated from the above descriptions, the information processing apparatus 100A according to the present embodiment is configured to display a list of sort keys when the click button of a mouse is pressed by a user for at least a predetermined time period to enable selection of a sort key from the displayed list. Then, the information processing apparatus 100A displays a list that is re-sorted using the selected sort key.

In the information processing apparatus 100A according to the present embodiment, even when an attribute information item to be used as a sort key is not displayed with the list of files, a list of attribute information item names as a list of sort keys may be easily displayed through simple operations. Further, a sort key may be easily selected from the displayed list of sort keys through simple operations.

Also, in the information processing apparatus 100A according to the present embodiment, display operations of displaying the list of sort keys may be terminated when the user stops pressing the click button of the mouse to release the click button, and in turn, the list displayed on the display device may be restored back to the original list displayed prior to the sort key change/selection operations. In this way, a re-sorted list resulting from changing the sort key to a selected sort key may be easily referenced, and the re-sorted list displayed after sort key change/selection operations may be easily restored back the original list displayed before the sort key change/selection operations.

It is noted that in the above-described embodiment of the present invention, a pointing device (mouse) is used as the input device 120. However, other embodiments are possible in which a keyboard is used as the input device 120 to perform processes similar to the above-described processes, for example.

In this case, in step S72 of FIG. 7, the designation process unit 112 may be configured to determine when a predetermined key of the keyboard is pressed for at least a predetermined time period, accept such an operating status as a sort key change command signal input, and convey the sort key change command signal to the control unit 111. Further, the designation process unit 112 may be configured to determine when the predetermined key is released (i.e., ceases to be pressed), accept such operating status as a list restoration command signal input, and convey the list restoration command signal to the control unit 111 so that display operations for displaying the lit of sort keys may be terminated.

As can be appreciated from the above descriptions, the information processing apparatus 100A according to the present embodiment may realize improved operationality without degrading list management functions upon performing operations using a list of files.

Third Embodiment

In the following, a third embodiment of the present invention is described with reference to FIGS. 9 and 10. An information processing apparatus 100B according to the third embodiment of the present invention differs from those of the first and second embodiments in that it is configured to display a list of apparatuses that are connected to this information processing apparatus 100B on a display device. It is noted that process operations performed by the information processing apparatus 100B for sorting the list displayed on the display device may be substantially identical to the process operations performed by the information processing apparatuses 100 and 100A according to the first and second embodiments of the present invention. Accordingly, the list of apparatuses displayed by the information processing apparatus 100B of the present embodiment is described below. It is noted that elements and features of the present embodiment that are identical to those of the first embodiment are given the same reference numerals and their descriptions are omitted.

As is described above, the information processing apparatus 100B according to the present embodiment is configured to acquire a list of apparatuses that are connected to this information processing apparatus 100B and display the acquired list. FIG. 9 is a block diagram showing a configuration of the information processing apparatus 100B.

As is shown in FIG. 9, the information processing apparatus 100B includes an apparatus list acquiring unit 119 and an apparatus information acquiring unit 121 in addition to the functional units included in the information processing apparatus 100 according to the first embodiment. It is noted that in FIG. 9, elements of the information processing apparatus 100B that are identical to those of the information processing apparatus 100 according to the first embodiment are not shown.

The apparatus list acquiring unit 119 is configured to acquire a list of apparatuses that are connected to the information processing apparatus 100B. In the following descriptions, it is assumed that the information processing apparatus 100B is connected to apparatuses a, b, and c via a network. It is noted that the apparatuses a, b, and c may correspond to general computers or peripheral apparatuses such as printers, for example. Also, although it is assumed in the present example that the apparatuses a, b, and c are connected to the information processing apparatus 100B via a network, other examples are possible in which apparatuses are externally connected to the information processing apparatus 100B via some other suitable connection means such as a USB (Universal Serial Bus).

The apparatus information acquiring unit 121 is configured to acquire apparatus information pertaining to the apparatuses connected to the information processing apparatus 100B. The apparatus information may include the apparatus name, the name of the registered user of the apparatus, and the IP address of the apparatus, for example. In one preferred embodiment, the apparatus information acquiring unit 121 may be configured to create a list of apparatus information item names based on the acquired apparatus information and store the list of apparatus information item names in the storage device 130.

In the information processing apparatus 100B according to the present embodiment, when an apparatus list display command signal directing display of the list of apparatuses connected to the information processing apparatus 100B is input via the input device 120, the designation process unit 112 accepts this display command signal conveys the same to the control unit 111. Upon receiving the display command signal, the control unit 111 controls the apparatus list acquiring unit 119 to acquire the list of apparatuses connected to the information processing apparatus 100B. Also, the control unit 111 controls the apparatus information acquiring unit 121 to acquire apparatus information of the apparatuses connected to the information processing apparatus 100B.

Upon acquiring the list of apparatuses connected to the information processing apparatus 100B and the apparatus information of the connected apparatuses, the control unit 111 hands over the acquired list and information to the display process unit 116. In turn, the display process unit 116 displays the list of apparatuses and the apparatus information of the apparatuses on the display device 140.

Figure 10:
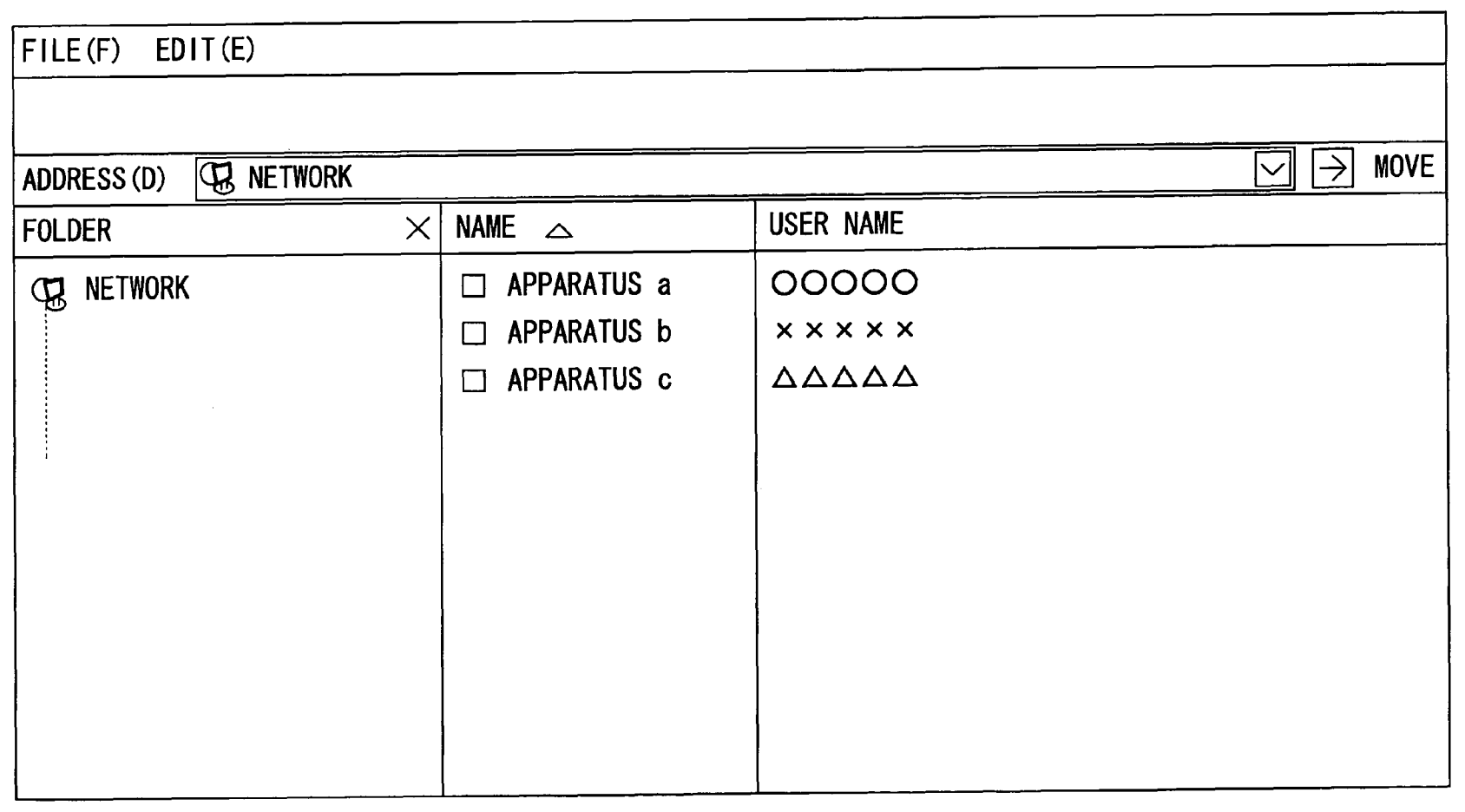

FIG. 10 is a diagram showing an exemplary list of apparatuses and apparatus information that is displayed on the display device 140 of the information processing apparatus 100B according to the present embodiment. Specifically the list displayed at the information processing apparatus 100B is sorted using one of the apparatus information items as the sort key. For example, the list shown in FIG. 10 is sorted using the apparatus name as the sort key.

In displaying the list of apparatuses at the information processing apparatus 100B according to the present embodiment, the display device 140 is controlled to display the list of apparatuses together with items of apparatus information pertaining to the apparatuses and their corresponding apparatus information item names. For example, in FIG. 10, the apparatus name and the user name of the apparatuses are displayed as items of apparatus information, and "name" and "user name" are displayed as their apparatus information item names.

It is noted that process operations related to sorting that are similar to those performed at the information processing apparatus 100 according to the first embodiment may be performed on the list of apparatuses displayed on the display device 140 of the information processing apparatus 100B according to the present embodiment. In this case, the list of apparatuses displayed at the information processing apparatus 100B may be sorted using a certain item of apparatus information as the sort key. Also, in the information processing apparatus 100B according to the present embodiment, the sort key may be changed by selecting the item name of the apparatus information item to be used for as the sort key. Also, in the information processing apparatus 100B according to the present embodiment, after the list of apparatuses is re-sorted using the selected sort key, the re-sorted list may be accurately restored back to the original list displayed before the re-sorting the list.

Also, it is noted that process operations for displaying a list of sort keys similar to those performed at the information processing apparatus according 100A of the second embodiment may be performed with respect to the list of apparatuses displayed by the information processing apparatus 100B according to the present embodiment. In this case, a list of apparatus information item names as a list of sort keys may be created and stored in the storage device 130 of the information processing apparatus 100B according to the present embodiment. In turn, the list of apparatus information item names as the list of sort keys may be read from the storage device 130 to be displayed at the information processing apparatus 100B of the present embodiment.

As can be appreciated from the above descriptions, the information processing apparatus 100B according to the present embodiment can realize improved operationality without degrading list managing functions upon performing operations using a list of apparatuses connected to this information processing apparatus 100B.

It is noted that the processes for realizing the functional elements and features of the above-described embodiments of the present invention may be embodied by a computer-readable program that is stored in a computer-readable medium, for example.

FIG. 11 is a diagram illustrating an example in which a computer-readable program configured to realize one or more of the functional features of the above-described embodiments is stored in a computer-readable medium. Specifically, in FIG. 11, a computer-readable program stored in a storage medium 210 is read and executed by a computer 300 to realize the functional features of the above-described embodiments.

For example, the computer 300 may include a CPU 310, a hard disk 320, a memory 330, a display unit 340, an input unit 350, a communications unit 360, and a storage medium read unit 370. The CPU 310 is a processor that executes various computations and processes on the computer 300. The hard disk 320 is a storage device that stores data such as applications that are run on the computer 300 and data created by such applications. The memory 330 stores data including setting values and computation results of the CPU 310, for example.

The display unit 340 is a display that enables a user to view data generated within the computer 300, for example. The input unit 350 may be a keyboard or a mouse that is operated by a user to input various data, for example. The communications unit 360 may be a network control unit that is configured to establish communication with an external apparatus. The storage medium read unit 370 may be a read device such as a floppy disk (registered trademark) driver that is configured to read data and programs stored in a storage medium, for example.

The storage medium 210 stores an information processing program 200 that is configured to enable a computer to realize one or more of the functional features of the above-described embodiments of the present invention. The information processing program 200 of the present embodiment may be read by the storage medium read unit 370 to be executed by the CPU 310. The storage medium 210 may be any type of storage medium that may be read by a computer such as a floppy disk or a CD-ROM (compact disk read only memory). In another example, the information processing program 200 may be transmitted over a network to be received by the communications unit 360 and stored in the hard disk 320.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2007-008196 filed on Jan. 17, 2007, the entire contents of which are hereby incorporated by reference.

What is claimed is:

1. An information processing apparatus comprising:
    a processor;
    a storage device;
    a display device that displays a list of files accessed by the processor and a portion of a plurality of items of attribute information of the files, the list being sorted using an item of the plurality of items of attribute information of the files as a sort key;
    a storing unit that stores in the storage device, upon receiving a sort key change command, information pertaining to current display positions of the files in a currently displayed list on the display device and information pertaining to the sort key used to sort the currently displayed list, the storing unit associating a number representing a display order of each file in the currently displayed list with a corresponding file name and storing the file name and the number representing the display order of each file in the storage device as display position information of each file;
    a display command unit that directs the display device to display a list of some or all of the plurality of items of attribute information in addition to the portion of the plurality of items of attribute information of the files already displayed, the list including one or more items of attribute information not included in the portion of the plurality of items of attribute information of the files;
    a selecting unit that selects another item of the plurality of items of attribute information of the files as a selected sort key from the list of some or all of the plurality of items of attribute information;
    a sorting unit that performs re-sorting operations on the currently displayed list using the selected sort key and generates a re-sorted list that is displayed by the display device; and
    a restoring unit that, upon receiving a restoration command, temporarily displays the re-sorted list on the display device and uses the information pertaining to the sort key and the display position information stored in the storage device to restore the temporarily displayed re-sorted list back to the list displayed prior to the execution of the re-sorting operations by the sorting unit,
    wherein
        the sort key change command is issued upon the information processing apparatus detecting that the currently displayed list is sorted, and
        the information pertaining to the current display positions of the files in the currently displayed list on the display device includes information of an actual order that the files are currently displayed.

2. The information processing apparatus as claimed in claim 1, further comprising:
    a managing unit that manages the plurality of items of attribute information of the files.

3. The information processing apparatus as claimed in claim 1, further comprising:
    a pointing device that includes the selecting unit.

4. The information processing apparatus as claimed in claim 1, further comprising:
    a keyboard that includes the selecting unit.

5. The information processing apparatus as claimed in claim 1, further comprising:
    a pointing device that includes the display command unit.

6. The information processing apparatus as claimed in claim 1, further comprising:
    a keyboard that includes the display command unit.

7. The information processing apparatus as claimed in claim 1, wherein
    the display device is configured to display an apparatus list indicating external apparatuses connected to the information processing apparatus, the apparatus list being is sorted using an item of a plurality of items of apparatus information of the external apparatuses;

the storing unit is configured to store information pertaining to a display order of the external apparatuses indicated in the apparatus list and information pertaining to the sort key used to sort the apparatus list in the storage device;

the selecting unit is configured to select another item of the plurality of items of apparatus information of the external apparatuses as the selected sort key;

the sorting unit is configured to execute the re-sorting operations on the apparatus list using the selected sort key; and the restoring unit is configured to use the information stored in the storage device to restore the re-sorted apparatus list back to the apparatus list displayed prior to the execution of the re-sorting operations.

8. The information processing apparatus as claimed in claim 1, wherein the storing unit is configured to associate a number representing a display order of each file of the list of files included in the currently displayed list with a corresponding file name and to store the file name and number representing the display order of said each file as the display position information of said each file.

9. An information processing method performed by an information processing apparatus including a processor, a storage device, and a display device configured to display a list of files accessed by the processor and a portion of a plurality of items of attribute information of the files, the list being sorted using an item of the plurality of items of attribute information of the files as a sort key, the method comprising:

storing, in the storage device and upon receiving a sort key change command, information pertaining to current display positions of the files in a currently displayed list on the display device and information pertaining to the sort key that sorts the currently displayed list, the storing associating a number representing a display order of each file in the currently displayed list with a corresponding file name and storing the file name and the number representing the display order of each file in the storage device as display position information of each file;

displaying a list of some or all of the plurality of items of attribute information in addition to the portion of the plurality of items of attribute information of the files already displayed, the list including one or more items of attribute information not included in the portion of the plurality of items of attribute information of the files;

selecting another item of the plurality of items of attribute information of the files as a selected sort key from the list of some or all of the plurality of items of attribute information;

executing re-sorting operations on the currently displayed list using the selected sort key and generating a re-sorted list that is displayed by the display device; and temporarily displaying, on the display device and on receiving a restoration command, the re-sorted list and restoring the temporarily displayed re-sorted list back to the list displayed prior to the execution of the re-sorting operations using the information pertaining to the sort key and the display position information stored in the storage device, wherein the sort key change command is issued upon the information processing apparatus detecting that the currently displayed list is sorted, and the information pertaining to the current display positions of the files in the currently displayed list on the display device includes information of an actual order that the files are currently displayed.

10. A computer-readable medium that stores a computer-readable program for processing information in an information processing apparatus including a processor, a storage device, and a display device that displays a list of files accessed by the processor and a portion of a plurality of items of attribute information of the files, the list being sorted using an item of the plurality of items of attribute information of the files as a sort key, the program being executed by a computer to perform the steps of:

storing, in the storage device and upon receiving a sort key change command, information pertaining to current display positions of the files in a currently displayed list on the display device and information pertaining to the sort key that sorts the currently displayed list, the storing associating a number representing a display order of each file in the currently displayed list with a corresponding file name and storing the file name and the number representing the display order of each file in the storage device as display position information of each file;

displaying a list of some or all of the plurality of items of attribute information in addition to the portion of the plurality of items of attribute information of the files already displayed, the list including one or more items of attribute information not included in the portion of the plurality of items of attribute information of the files;

selecting another item of the plurality of items of attribute information of the files as a selected sort key from the list of some or all of the plurality of items of attribute information;

executing re-sorting operations on the currently displayed list using the selected sort key and generating a re-sorted list that is displayed by the display device; and temporarily displaying, on the display device and on receiving a restoration command, the re-sorted list and restoring the temporarily displayed re-sorted list back to the list displayed prior to the execution of the re-sorting operations using the information pertaining to the sort key and the display position information stored in the storage device, wherein the sort key change command is issued upon the information processing apparatus detecting that the currently displayed list is sorted, and the information pertaining to the current display positions of the files in the currently displayed list on the display device includes information of an actual order that the files are currently displayed.

* * * * *